(12) United States Patent
Nalawadi

(10) Patent No.: US 6,968,412 B1
(45) Date of Patent: Nov. 22, 2005

(54) METHOD AND APPARATUS FOR INTERRUPT CONTROLLER DATA RE-DIRECTION

(75) Inventor: Rajeev K. Nalawadi, Rancho Cordova, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/476,443

(22) Filed: Dec. 30, 1999

(51) Int. Cl.[7] .............................................. G06F 13/24
(52) U.S. Cl. ........................ 710/261; 710/261; 710/263
(58) Field of Search ................................ 710/260–269, 710/48

(56) References Cited

U.S. PATENT DOCUMENTS

| | | | | |
|---|---|---|---|---|
| 5,325,529 A | * | 6/1994 | Brown et al. ............... 709/222 |
| 5,481,725 A | * | 1/1996 | Jayakumar et al. ........... 710/48 |
| 5,619,706 A | * | 4/1997 | Young ........................ 710/268 |
| 5,745,772 A | * | 4/1998 | Klein ......................... 710/266 |
| 5,848,279 A | * | 12/1998 | Wu et al. .................... 710/268 |
| 5,987,538 A | * | 11/1999 | Tavalaei et al. .............. 710/48 |

* cited by examiner

Primary Examiner—Tim Vo
(74) Attorney, Agent, or Firm—Blakely, Sokoloff, Taylor & Zafman LLP

(57) ABSTRACT

In one aspect, a method is disclosed. The method includes trapping initializing data of a first interrupt type to a first interrupt controller, re-routing the initializing data of the first interrupt type to a second interrupt controller, and configuring the second interrupt controller to manage interrupt of the first interrupt type.

13 Claims, 3 Drawing Sheets

METHOD AND APPARATUS FOR INTERRUPT CONTROLLER DATA RE-DIRECTION

BACKGROUND OF THE INVENTION

1. Field of the Invention

The invention relates to computer system peripheral connections and more particularly to managing system interrupts.

2. Background

Peripheral Component Interconnect (PCI)-Extended Industry Standard Architecture (EISA) bridge sets provide an I/O subsystem for many computer systems. One Peripheral Component Interconnect (PCI) standard is PCI Local Bus standard version 2.2 (Jan. 5, 1999). The chip set generally consists of two components—the PCI-EISA Bridge (PCEB) and the EISA system component (ESC). In general, the ESC implements system functions such as timer-counter, direct memory access (DMA), and interrupt control.

In one form of interrupt control utilized in certain chip set configurations of Intel Corporation of Santa Clara, Calif., an EISA compatible interrupt controller of the ESC incorporates the functionality of two 82C59 interrupt controllers that are cascaded providing fourteen external and two internal interrupts. The ESC also contains an Advanced Programmable Interrupt Controller (APIC). The APIC can be used in either a uni-processor or multi-processor system. The APIC provides multi-processor interrupt management and incorporates both static and dynamic symmetric interrupt distribution across all processors. In systems with multiple I/O subsystems, each system can have its own set of interrupts.

As noted, the EISA compatible interrupt controller incorporates the functionality of two 82C59 interrupt controllers. The two controllers are cascaded into a master interrupter controller and a slave interrupt controller. Two internal interrupts are used for internal function only and are not available at the chip periphery. One interrupt is used to cascade the two controllers together and another is used as a system timer interrupt. The remaining 14 interrupt lines are available for external system interrupts. The interrupts are programmed to utilize on the order of 2000 logic gates. Examples of uses of the 14 system interrupts include interrupts for a keyboard, hard drive, modem, etc.

While the standard EISA compatible interrupt controller is intended for use in a uni-processor system, the APIC can be used in either a uni-processor or multi-processor system. An APIC provides multi-processor interrupt management and incorporates static and dynamic symmetric interrupt distribution across all processors. In systems with multiple I/O subsystems, each subsystem can have its own set of interrupts.

At the system level, an APIC consists of two parts—one residing in the I/O subsystem (I/O APIC) and the other in the CPU (local APIC). The ESC contains the I/O APIC unit.

The I/O APIC unit consists of a set of interrupt input signals, a 16-entry Interrupt Redirection. Table, programmable registers, and a message unit for sending and receiving APIC messages over the APIC bus. I/O devices inject interrupts into the system by asserting one of the interrupt lines to the I/O APIC. The I/O APIC selects a corresponding entry in the redirection table and uses the information of that entry to format an interrupt request message. Each entry in the redirection table can be individually programmed to indicate edge/level sensitive interrupt signals, the interrupt vector and priority, the destination processor, and how the processor is selected (e.g., statically or dynamically). The information in the table is used to transmit a message to other APIC units via the APIC bus.

In addition to its compatibility with multi-processor environments, the APIC system offers the ability to handle a greater number of system interrupts with greater flexibility than the EISA compatible interrupt controller. Nevertheless, the EISA compatible interrupt controller remains a legacy standard for interrupt control in the modern processor environment.

SUMMARY OF THE INVENTION

In one aspect, a method is disclosed. The method includes trapping initializing data of a first interrupt type to a first interrupt controller. The initializing data of the first interrupt type is re-routed to a second interrupt controller. The second interrupt controller is configured to manage interrupts of the first interrupt type.

BRIEF DESCRIPTION OF THE DRAWINGS

The features, aspects, and advantages of the invention will become more thoroughly apparent from the following detailed description, appended claims, and accompanying drawings in which:

DETAILED DESCRIPTION OF THE INVENTION

In one aspect, the invention relates to a method and system to handle all system interrupts through the APIC system, including processor systems that rely for at least a portion of their interrupt control on the legacy standard of the EISA compatible interrupt controller. In this manner, the invention allows systems that rely partially on EISA compatible interrupt controllers, such as the 82C59 interrupt controller to be incorporated in a multi-processor environment. By utilizing the APIC system of interrupt control the number of dedicated gates required for interrupt control can be reduced.

Figure 1:
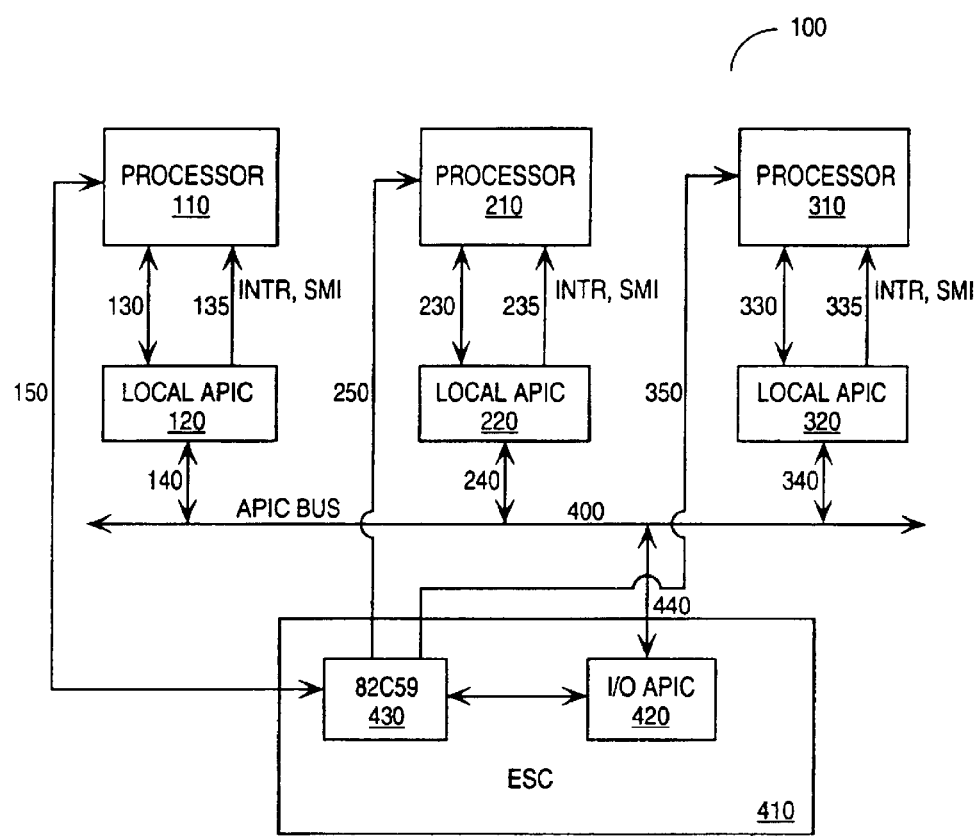
FIG. 1 is a schematic block diagram of a multi-processor environment illustrating the interrupt control for the system.

FIG. 1 schematically illustrates a block diagram of a multi-processor environment suitable for interrupt control according to the invention. System 100 is a multi-processor system, including processor 110, processor 210, and processor 310. Each processor contains a memory element (e.g., random access memory, read only memory, cache, etc.) System 100 also includes, in this illustration, EISA system component (ESC) 410. ESC 410 incorporates the standard EISA compatible interrupt controller and the APIC. In one embodiment, the EISA compatible interrupt controller includes two 82C59 interrupt controllers 430 arranged in a master (CNTRL-1)-slave (CNTRL-2) configuration as known in the art. In one embodiment, the two 82C59 interrupt controllers are utilized to control the interrupt functions listed in Table 1:

TABLE 1

Typical Interrupt Functions

| Priority | Label | Controller | Typical Interrupt Source |
|---|---|---|---|
| 1 | IRQ0 | 1 | Interval Timer 1, Counter 0 OUT |
| 2 | IRQ1 | 1 | Keyboard |
| 3–10 | IRQ2 | 1 | Interrupt from Controller 2 |
| 3 | IRQ8# | 2 | Real Time Clock |
| 4 | IRQ9 | 2 | Expansion Bus Pin B04 |
| 5 | IRQ10 | 2 | Expansion Bus Pin D03 |
| 6 | IRQ11 | 2 | Expansion Bus Pin D04 |
| 7 | IRQ12 | 2 | Expansion Bus Pin D05 |
| 8 | IRQ13 | 2 | Coprocessor Error, Chaining |
| 9 | IRQ14 | 2 | Fixed Disk Drive Controller Expansion Bus Pin D07 |
| 10 | IRQ15 | 2 | Expansion Bus Pin D06 |
| 11 | IRQ3 | 1 | Serial Port 2, Expansion Bus B25 |
| 12 | IRQ4 | 1 | Serial Port 1, Expansion Bus B24 |
| 13 | IRQ5 | 1 | Parallel Port 2, Expansion Bus B23 |
| 14 | IRQ6 | 1 | Diskette Controller, Expansion Bus B22 |
| 15 | IRQ7 | 1 | Parallel Port 1, Expansion Bus B21 |

The following demonstrates the interrupt sequence for a 80×86-type system.

1. One or more of the Interrupt Request (IRQ[x]) lines are raised high, setting the corresponding Interrupt Request Register (IRR) bit(s).
2. The Interrupt Controller evaluates these requests, and sends an INTR to the CPU, if appropriate.
3. The CPU acknowledges the INTR and responds with an interrupt acknowledge cycle. This cycle is translated into a PCI bus command. This PCI command is broadcast over the PCI bus as a single cycle.
4. Upon receiving an interrupt acknowledge cycle from the CPU over the PCI, the PCI-EISA bridge (PCEB) converts the single cycle into an INTA# pulse to the ESC. The ESC uses the INTA# pulse to generate the two cycles that the internal 82C59 pair can respond to with the expected interrupt vector. The cycle conversion is performed by a functional block in the ESC Interrupt Controller Unit. The internally generated interrupt acknowledge cycle is completed as soon as possible as the PCI bus is held in wait states until the interrupt vector data is returned. Each cycle appears as an interrupt acknowledge pulse on the INTA# pin of the cascaded interrupt controllers. These two pulses are not observable at the ESC periphery.
5. Upon receiving the first internally generated interrupt acknowledge, the highest priority In-Service Register (ISR) bit is set and the corresponding IRR bit is reset. The Interrupt Controller does not drive the Data Bus during this cycle. On the trailing edge of the first cycle pulse, a slave identification code is broadcast by the master to the slave on a private, internal three bit wide bus. The slave controller uses these bits to determine if it must respond with an interrupt vector during the second INTA# cycle.
6. Upon receiving the second internally generated interrupt acknowledge, the Interrupt Controller releases an 8 bit pointer (the interrupt vector) onto the Data Bus where it is read by the CPU.
7. This generally completes the interrupt cycle. In an automatic end-of-interrupt mode the ISR bit is reset at the end of the second interrupt acknowledge cycle pulse.

Otherwise, the ISR bit remains set until an appropriate end-of-interrupt (EOI) command is issued at the end of the interrupt subroutine.

At the system level, the APIC consists of two parts—one residing in the I/O subsystem (I/O APIC 420) and the other, local APIC 120, 220, and 320, residing in processor 110, processor 210, and processor 310, respectively. The local APIC and I/O APIC 420 communicate over dedicated APIC bus 400. The ESC's I/O APIC bus interface consists of bi-directional data signals and a clock input. Each local APIC (local APIC 120, local APIC 220, and local APIC 320) contains intelligence to determine whether or not each processor should accept interrupts broadcast on APIC bus 400. The local APIC unit also provides local pending of interrupts, nesting and masking of interrupts, and handles all interactions with its local processor (e.g., interrupt request (INTR), interrupt acknowledge (INTA, and EOI protocol). Each local APIC also provides inter-processor interrupts and a timer to its local processor.

Figure 2:
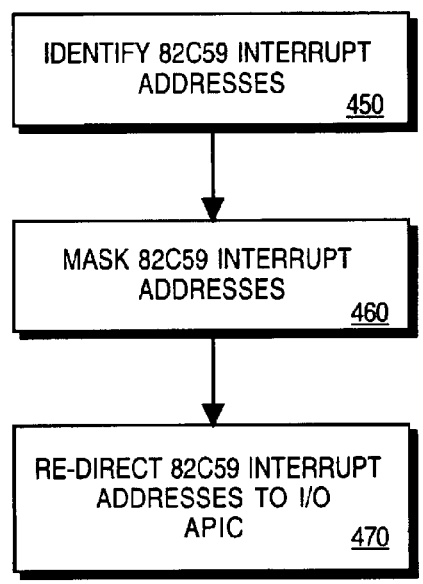
FIG. 2 is a flow chart of an embodiment of the method of the invention.

As shown in FIG. 2, the invention contemplates identifying and redirecting EISA compatible interrupt signals (block 450), masking the EISA compatible interrupt controller interrupt addresses (block 460) and re-directing the interrupt addresses to the I/O APIC (block 470). In this manner, some or all of the interrupts handled by the EISA compatible interrupt controller (e.g., the 82C59 controller(s)) are instead handled by the I/O APIC.

Figure 3:
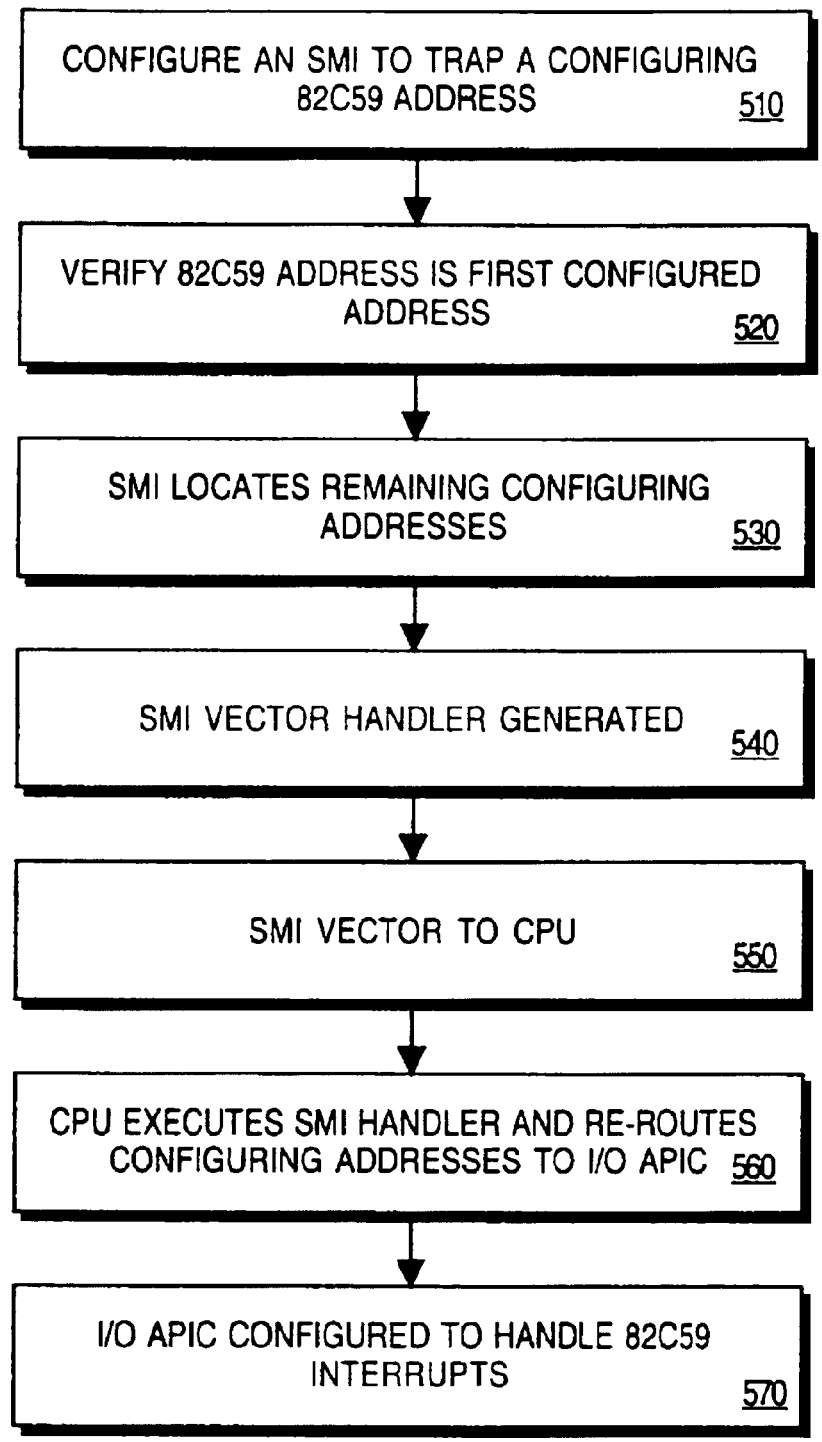
FIG. 3 is a specific embodiment of the method of the invention.

FIG. 3 describes a method of redirecting 82C59 interrupt addresses to an I/O APIC. This embodiment takes advantage of the normal process of initializing interrupt registers on system start-up. The embodiment seeks to identify 82C59 interrupt addresses through system logic. One way this is accomplished is by configuring a system management interrupt (SMI) to trap a configuring 82C59 address (block 510). An SMI is derived from power management architecture of the ESC. In particular, the system management mode (SMM) is a function of the ESC's power management architecture that includes software that controls transitions between a Power-On state and a Fast-Off state. The Fast-Off state is generally utilized in modern processors to permit a system to operate in a low power state without being powered down. When the system is in a Fast-Off state, the system consumes less power than the Power-On state and is not in a Power Off state. Events such as pressing a key on a keyboard or moving a mouse constitutes a Fast-On event to convert from a Fast-Off state to a Power-On state.

To invoke SMM software, the ESC generates an SMI to the processor. An SMI offers serialized execution. Once an SMI happens, the processor stops and processes the SMI.

The 82C59 generally contains four initializing address registers—20h, 21h, A0h, A1h. The four address registers are initialized by four initialization command words: ICW1, ICW2, ICW3, and ICW4. Before normal operation can begin, each interrupt controller in the system must be initialized. In the ESC, this is a four byte sequence. The base address for each interrupt controller is a fixed location in I/O memory space, at 0020h for CNTRL-1 and 00A0h for CNTRL-2. An I/O write to the CNTRL-1 or CNTRL-2 base address with data bit 4 equal to 1 is interpreted as ICW1. For ESC-based EISA systems, three I/O writes to "base address+ 1" (021h for CNTRL-1 and 0A0h for CNTRL-2) must follow the ICW1. The first write to "base address+1" (021h/ 0A0h) performs ICW2, the second write performs ICW3, and the third write performs ICW4. Initialization of the 82C59 controller thus generally occurs in a particular sequence, ICW1, ICW2, ICW3, and ICW4.

In one embodiment, an SMI is configured to recognize and trap a configuring 82C59 address, such as one of the identified initialization command words. In addition to trapping a configuring 82C59 address, the trapped address is analyzed to determine whether or not the address is the first configuring address (block 520). As noted above, 82C59 is configured in a specific sequence, therefore, prior to re-routing the initialization addresses to I/O APIC as a trap, the SMI locates the first configuring address. A look-up table containing the appropriate order of the initialization command words is provided to identify the appropriate configuring address.

Once the SMI locates the first configuring address, the SMI then locates the remaining configuring addresses (block 530). An SMI vector handler is then generated to direct the appropriate processor to find the interrupt (block 540). The SMI vector handler is associated with the I/O APIC. Once the SMI vector handler is generated, an SMI vector is passed to the appropriate processor (block 550). In response to the SMI vector, the ptocessor re-routes configuring addresses to the I/O APIC (block 560). In this regard, the I/O APIC is then configured to handle 82C59 interrupts.

By handling all 82C59 interrupts through the APIC system, the invention supports the use of conventional chip set systems with advanced operating systems that do not support 82C59 interrupt control. The invention also supports the use of such chip set systems in multi-processor environments.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A method comprising:
   storing instructions for sending interrupt controller initializing data to a first interrupt controller;
   storing instructions for re-routing interrupt controller initializing data to a second interrupt controller;
   sending interrupt controller initializing data to the first interrupt controller;
   re-routing the interrupt controller initializing data to the second interrupt controller; and
   configuring the second interrupt controller to manage interrupts of at least a first interrupt type.

2. The method of claim 1, further comprising:
   configuring a system management interrupt to recognize interrupt controller initializing data for the first interrupt controller.

3. The method of claim 1, further comprising:
   configuring a system management interrupt to recognize interrupt controller initializing data; and
   re-routing interrupt controller initializing data to the second interrupt controller starting from a first command word,
   wherein interrupt controller initializing data comprises a plurality of command words including the first command word that begins the initializing of the first interrupt controller.

4. The method of claim 1, wherein the first interrupt controller comprises an 82C59 controller and the second interrupt controller comprises an advanced programmable interrupt controller.

5. A machine readable storage media containing executable program instructions which when executed cause a digital processing system to perform a method comprising:
   storing instructions for sending interrupt controller initializing data to a first interrupt controller;
   storing instructions for re-routing interrupt controller initializing data to a second interrupt controller;
   sending interrupt controller initializing data to the first interrupt controller;
   re-routing interrupt controller initializing data to the second interrupt controller; and
   configuring the second interrupt controller to manage interrupts of a first interrupt type.

6. The media of claim 5, further comprising:
   configuring a system management interrupt to recognize interrupt controller initializing data for the first interrupt controller.

7. The media of claim 5, further comprising:
   configuring a system management interrupt to recognize interrupt controller initializing data; and
   re-routing interrupt controller initializing data to the second interrupt controller starting from a first command word,
   wherein interrupt controller initializing data comprises a plurality of command words including the first command word that begins the initializing of the first interrupt controller.

8. The media of claim 5, wherein the first interrupt controller comprises an 82C59 controller and the second interrupt controller comprises an advanced programmable interrupt controller.

9. A system comprising:
   a central processing unit (CPU);
   a first bus coupled to the CPU;
   a first interrupt controller, coupled to the first bus, operable to manage communication with the CPU of interrupts of a first interrupt type;
   a second bus coupled to the CPU;
   a second interrupt controller, coupled to the second bus and to the first interrupt controller, operable to manage communication with the CPU of interrupts of a second interrupt type; and
   a memory coupled to the second interrupt controller comprising a computer-readable medium having a computer-readable program embodied therein for directing operation of the system, the computer-readable program comprising:
   instructions for managing interrupts of the first interrupt type by the second interrupt controller, exclusive of the first interrupt controller;
   instructions for sending interrupt controller initializing data to the first interrupt controller to initialize the first interrupt controller;
   instructions for re-routing interrupt controller initializing data to the second interrupt controller to initialize the second interrupt controller; and
   instructions for configuring the second interrupt controller to manage interrupts of the first interrupt type.

10. The system of claim 9, wherein the instructions for re-routing interrupt controller initializing data comprise:
    instructions for configuring a system management interrupt to recognize interrupt controller initializing data related to at least the first interrupt type.

11. The system of claim 9, wherein interrupt controller initializing data comprises a plurality of command words and a first command word begins the initializing of the first interrupt controller, and the computer-readable program comprises instructions for configuring a system management interrupt to recognize initializing data related to at least the first interrupt type and re-route initializing data to the second interrupt controller from the first command word.

12. The system of claim 9, wherein the first interrupt controller comprises an 82C59 controller and the second interrupt controller comprises an advanced programmable interrupt controller.

13. A system comprising:

a central processing unit (CPU);

first means of interrupt processing for managing communication with the CPU of interrupts of a first interrupt type;

second means of interrupt processing for managing communication with the CPU of interrupts of a second interrupt type;

means for routing interrupts of the first interrupt type to the second interrupt processing means;

means for sending interrupt controller initializing data to the first interrupt processing means;

means for re-routing interrupt controller initializing data to the second interrupt processing means;

means for managing interrupts of the first interrupt type by the second interrupt processing means exclusive of the first interrupt processing means;

means for storing instructions for sending interrupt controller initializing data to a first interrupt controller; and means storing instructions for re-routing interrupt controller initializing data to a second interrupt controller.

* * * * *